United States Patent [19]

Sugalski

[11] 4,320,182

[45] Mar. 16, 1982

[54] ELECTROCHEMICAL CELL HAVING CAST-IN-PLACE INSULATOR

[75] Inventor: Raymond K. Sugalski, Gainesville, Fla.

[73] Assignee: General Electric Company, Gainesville, Fla.

[21] Appl. No.: 96,461

[22] Filed: Nov. 21, 1979

[51] Int. Cl.³ .............................................. H01M 2/02
[52] U.S. Cl. ..................................... 429/94; 429/129; 429/130; 429/164
[58] Field of Search ................. 429/94, 161, 163, 164, 429/165, 166, 167, 168, 169, 170, 171, 174, 130, 129

[56] References Cited

U.S. PATENT DOCUMENTS

| | | | |
|---|---|---|---|
| 627,917 | 6/1899 | Fuld | 429/171 |
| 1,439,956 | 12/1922 | Fuld | 429/171 |
| 2,807,658 | 9/1957 | Hatfield | 429/94 |
| 3,378,408 | 4/1968 | Hamlen et al. | 429/94 |

Primary Examiner—Donald L. Walton
Attorney, Agent, or Firm—Morgan, Finnegan, Pine, Foley & Lee

[57] ABSTRACT

An electrochemical cell having a conductive casing and an electrode plate assembly received therein, the plate assembly having exposable edge portions adjacent an interior surface of the casing, and insulation means comprising a nonconductive insulating casting self-adhered to the interior surface of the cell casing and disposed intermediate the interior surface and the exposable portions of the electrode plate assembly. The insulating casting is formed from a flowable material which is dispensed into the casing while flowable and which quickly hardens in place to become bonded to the casing.

3 Claims, 4 Drawing Figures

ELECTROCHEMICAL CELL HAVING CAST-IN-PLACE INSULATOR

BACKGROUND OF THE INVENTION

This invention relates to the manufacture of electrochemical cells and, more specifically, to an electrochemical cell and a method for making such a cell, in which an insulator is disposed at the interior of the cell casing between exposable portions of an electrode plate assembly and the conductive casing.

The typical electrochemical cell is of cylindrical form, the familiar pen-light or flashlight size battery, for example, in which the cell comprises a conductive cylindrical casing which serves as the negative terminal for the cell and an internal spirally wound plate electrode assembly of interleaved positive and negative electrodes. During manufacture, the coiled electrode assembly is inserted into the open end of the cylindrical casing. An electrical connection is made between the positive electrode plate edges and the central terminal of an insulated top closure member. Thereafter, the closure member is inserted into the top of the casing and is secured to its rim in the conventional manner such that the electrically positive cover assembly is insulated from the electrically negative casing.

It has been found with electrochemical cells constructed in this manner that the coiled plate electrodes can telescope, i.e., displace axially of the cell, relative to one another, particularly at the bottom of the casing. If the displacement of the positive plate convolutions is excessive, they will make electrical contact with the bottom of the casing. Since the casing is electrically negative, the cell becomes shorted out if any of the edges of the positive plates have touched the bottom of the casing. For this reason, it is sometimes required to use an insulator at the bottom of the casing between the casing surface and the lower edges of the coiled electrode plate assembly. For example, a thin polyethylene disk can be placed in the bottom of the casing prior to insertion of the coiled plate assembly to insulate the electrodes from the casing. Although this does solve the problem of inadvertent shorting of the cell due to the electrode telescoping problem, it poses manufacturing disadvantages.

It is the usual practice to stamp out the cylindrical casings separately and to feed these casings from a hopper or bin during subsequent manufacturing steps, for example inserting the coiled plate electrode assembly into the casing. If an attempt is made to place the insulating disk at the bottom of the casing prior to the time that they are loaded into the hopper, the insulator disks can become displaced or fall out altogether. Moreover, in some manufacturing operations, the coiled plate assembly is inserted into the casing can while the latter is oriented horizontally. Any attempt to put the insulator disk into the bottom of the casing even immediately prior to insertion of the plate electrode assembly, makes it difficult to keep it in place.

Another alternative approach—the use of adhesive insulators which would stick in place once inserted into the casing—is not a practicable solution because of the difficulty in handling materials which are adhesive-coated. That is, an adhesive backing on the insulator would preclude rapid feeding and placing of the insulators into the casings on a production line basis because of the tendency of the adhesive backing to adhere to other insulators and machine components.

SUMMARY OF THE INVENTION

The present invention avoids the manufacturing problems discussed above. In accordance with the invention, an insulator is cast in place at the bottom of the casing (or at other surfaces to be insulated from the electrodes) prior to insertion of the electrode assembly. The insulator comprises a casting which is self-adhered to the interior surface of the casing and so positioned that it is intermediate the casing surface and the exposable portions of the electrode plate assembly.

The insulator casting is formed from a material which is initially flowable when it is dispensed into the casing, and which cures or dries to a non-flowable, hardened form in a relatively short period of time. This enables the insulator casting material to be dispensed into the casing on the production line, the material quickly hardening to a solid as the cell casing moves along the production line.

In practicing the invention, the casing may be subjected to heating and sonic vibration immediately after the flowable material is dispensed into the casing so as to facilitate hardening and the desired distribution of the insulating material.

The distribution pattern of the material within the casing can be controlled, within limits, by controlling the amount of material that is dispensed. For example, the material, depending on its viscosity, exhibits a concave meniscus pattern at the bottom of the casing. If the material layer is relatively thin, the material forms a ring of insulation which leaves a bare or exposed surface at the center of this ring. Since the unwanted displacement of the plate electrode convolutions generally occurs at the outer periphery of the electrode coil, where the cast insulator material is thickest, it is possible to utilize the exposed portion at the center of the casing bottom for the attachment or welding of a connector tab extending between the exposed edge portions of the negative plate electrode and the casing bottom.

DESCRIPTION OF THE DRAWINGS

The invention will be better understood with reference to the following detailed description and to the drawings, in which.

DESCRIPTION OF PREFERRED EMBODIMENTS

Figure 1:
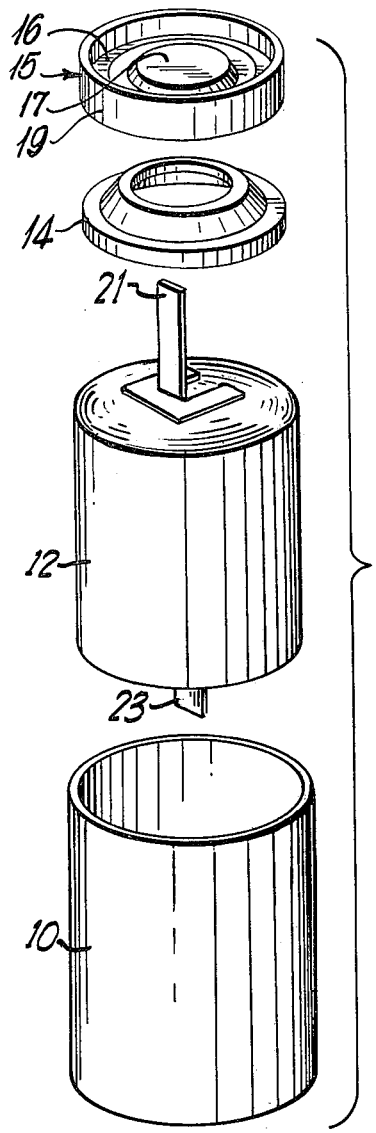
FIG. 1 is an exploded view showing a conventional casing for a rechargeable electrochemical cell and its associated spirally-wound plate assembly.

The exploded view of FIG. 1 shows the fundamental elements of a representative popular rechargeable electrochemical cell using nickel/cadmium electrodes. The cell comprises an open-ended cylindrical casing 10 in the shape of a can, a spirally-wound electrode assembly 12, a top insulator disk 14, and a cover assembly 15. The cover assembly includes a metal closure cover 16 having a central terminal portion 17, and an insulating disk 19 having an upstanding rim. This disk 19 insulates the electrically positive cover member 16 from the electrically negative casing 10 when the cover assembly 15 is joined to the casing.

As shown in FIG. 1, the electrode assembly includes a connector tab 21 welded to the exposed top edge of the positive electrode. This tab, prior to closure of the cell, is welded to the underside of the cover member 16 to form the positive electrical connection between the positive plate electrode and the terminal 17. Extending from the bottom of the electrode assembly 12 is a similar connector tab 23. This tab 23 is welded to the exposed bottom edges of the coiled negative plate electrode and is either bent over and up the side of the electrode coil assembly 12 prior to insertion of the assembly into the casing (as will be explained in connection with FIG. 2) or is bent over and welded to the interior surface at the bottom of the casing (as will be explained in connection with FIG. 3). Tab 23 forms the negative electrical connection between the negative plate electrode and the casing.

Figure 2:
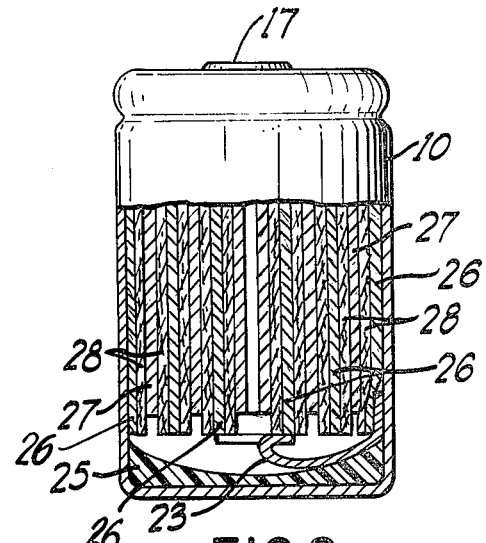
FIG. 2 is a partial cross-sectional view through a rechargeable electrochemical cell having a cast-in-place insulator according to the invention.

In accordance with the invention, a self-adhering insulating material is disposed at the interior of the casing between exposed portions of the plate electrodes and the casing interior to insulate those exposed portions from the casing. Referring to FIG. 2, such an insulating material is shown at the bottom of the casing 10 and is designated by the numeral 25. It will be seen that the material 25 has a greater thickness, or vertical dimension, at the side of the casing than at the center. This is due to the fact that the insulating material 25 is placed into the can while in a viscous flowable state, and it forms a meniscus so as to impart a concave cross-section to the insulating material when it becomes hardened.

For purpose of explanation, FIG. 2 shows in somewhat more detail the construction of the spiral electrode assembly. This assembly comprises a negative plate 26 and a positive plate 27 which are spaced apart by one or more separator layers 28 and coiled together in a unitary spiralled cylinder. Thus, the positive and negative electrodes alternate throughout the coiled assembly, as shown in FIG. 2. To enable electrical connections to be made to the respective positive and negative electrodes, they are axially staggered. That is, the bottom edges of the negative plate electrode 26 extend beyond the bottom edges of the positive plate electrode 27. At the top of the electrode assembly, however, the reverse is true. That is, the top edges of the positive plate electrode 27 extend beyond the top edges of the negative plate electrode 26. This allows the respective connector tabs 21, 23 to be electrically welded to the exposed edges of the plate electrodes, the negative tab 23 being welded to the exposed edges of the negative plate and the positive tab 21 being welded to the exposed upper edges of the positive plate.

Figure 3:
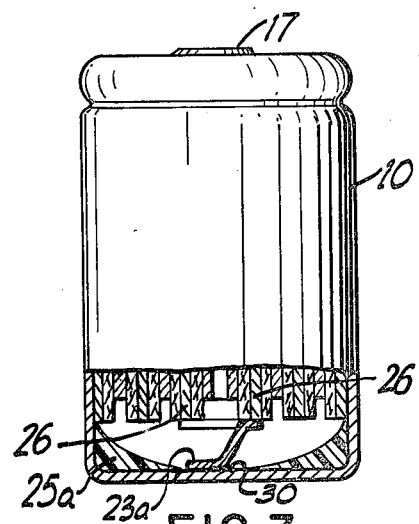
FIG. 3 is a view similar to FIG. 2, but showing an alternate form of cast-in-place insulator according to the invention.

Referring to FIG. 3, it will be seen that the cast insulator 25a at the bottom of the casing is discontinuous over the bottom surface so as to leave a round exposed surface portion 30 at the bottom of the casing can. This exposed surface portion 30 provides a surface for the welding of the negative tab 23a to the casing. The form of insulator 25a, shown in FIG. 3, is formed most easily by simply using less insulation material when it is in the flowable state. Of course, it may also be possible to alter the viscosity of the material to achieve similar results but, for any given material, a portion of the interior surface of the casing may be exposed by simply carefully limiting the amount of flowable insulating material that is dispensed into the casing. As earlier noted, it is possible to leave an exposed portion such as the portion 30, in FIG. 3, because the undesired telescoping of the coiled electrodes generally occurs at the outer edges of the coil, and this is where the insulator 25a is found in the embodiment of FIG. 3.

Figure 4:
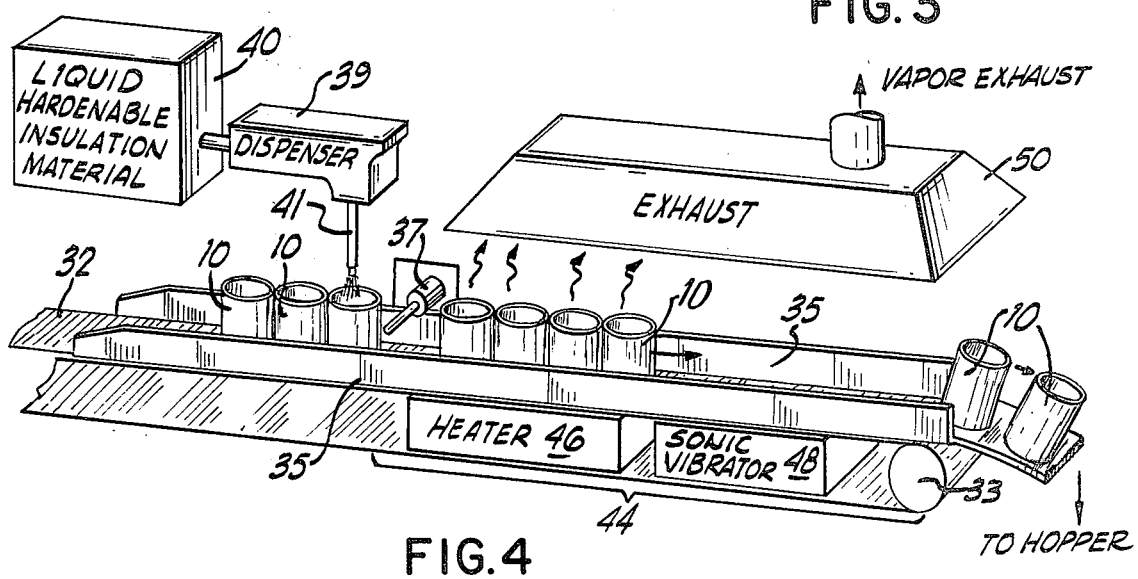
FIG. 4 is a pictorial schematic illustration of apparatus for carrying out the method of forming cast-in-place insulators in accordance with the invention.

Referring now to FIG. 4, there is shown a pictorial representation of apparatus used in carrying out the invention. The apparatus includes a conventional conveyer mechanism providing moving conveyer belt 32 and a belt driving drum 33 at an end of the belt. (The other end of the belt has not been shown and, of course, the belt mechanism may comprise other elements not shown). Cell casings 10 are transported on the upper surface of conveyer belt 32 and are guided through an insulating material dispensing station by side rails 35.

As cell casings 10 conveyed by the belt 32 reach the dispensing station, they encounter an escape mechanism, represented by the controllably retractable pneumatic piston 37 in FIG. 4. It will be understood that the escapement mechanism 37 momentarily interrupts the motion of the casing 10 to permit a hardenable liquid insulating material to be dispensed into the bottom of the casing. To that end, a conventional dispenser, e.g., a Tridak dispenser 39 supplied with liquid hardenable insulation material from the reservoir 40 is located to dispense a metered amount of insulation material through a dispensing needle 41, located immediately above the most forward casing 10 whose motion has been interrupted by escapement mechanism 37. Dispenser 39, together with its reservoir 40, is sealed from the atmosphere to preclude evaporation and premature hardening of the insulation material by exposure to air.

After the flowable liquid hardenable insulation material has been dispensed into the casing, and the escapement mechanism 37 released, the casing is permitted to advance to the forward section 44 of the conveyer. In this section of the conveyer, the casing encounters a heated vibratory region which hastens the drying or curing of the dispensed liquid material. When a preferred material described below is used, the material will set up within two minutes after being dispensed. However, by heating and simultaneously vibrating the casing with the dispensed material in it, the set-up time is hastened. In FIG. 4, the heated vibratory section of the conveyer mechanism is designated by the numeral 44. This section includes a heater 46 and a sonic vibrator 48 disposed immediately below the upper course of the conveyer. Of course, other heating means might be used as, for example, infra red lamps disposed adjacent the casings' path.

As noted, the heated vibratory section of the track hastens the curing or set-up time of the dispensed insulating material. During the drying phase, vapor is released from the material, this vapor being collected by an exhaust hood 50 and vented outside the plant. Upon leaving the heated vibratory section 44 of the conveyer, the insulator material is sufficiently rigid to retain its shape in subsequent production operations. Accordingly, the casings are fed to a hopper (not shown) where they may be provided seriatim to the machine for inserting the coiled electrode assembly.

Although it is possible to use any of several materials which are liquid at room temperature and which exhibit a rapid curing or set-up time, it has been found that the following material, available from B. F. Goodrich and designated as KE-1123, exhibits desirable properties. This material is a 90% methyl ethyl ketone containing 10% vinyl and fillers. Table I below lists the properties for this material.

TABLE I

| Boiling Point | 171° F. |
|---|---|
| Vapor Pressure | 70.6 millimeters mercury |
| Vapor Density (air = 1) | 2.5 |
| Specific Gravity | .953 |
| Evaporation Rate (butyl acetate = 1) | 4.6 |
| Flash Point | 20° F. (closed cup) |
| Flammability Limits (% by volume) | Lower-2 Upper-10 |
| Solubility in Water | Appreciable |

With the foregoing material, the casings can be filled with the required amount of insulating material at a rate of 50/minute. This provides about one second for the dispensing operation, which is sufficient.

The quantity required for properly insulating the bottom of the casing from the plate electrodes, of course, varies in accordance with the size of the cell, and also in accordance with the desired thickness of the insulating layer. As mentioned above, the quantity will be less when it is required to leave an exposed interior portion of the casing surface for the purpose of welding. Nevertheless, Table II below, sets forth the approximate quantities that are required to completely insulate the bottom of the casing in the manner shown in FIG. 2. The left-hand column of Table II gives the cell size designation in accordance with current nomenclature (General Electric Company). The KE-1123 material is stable in the presence of potassium hydroxide electrolyte commonly used in the rechargeable cells listed below.

TABLE II

| Cell Size | Casing Inside Diameter | Area of Casing Bottom (in.$^2$) | Material Required (gm.) |
|---|---|---|---|
| 9V | .467" | .17 | .06 gm. |
| AAsd | .514 | .21 | .07 |
| AA | .525 | .22 | .08 |
| A | .595 | .28 | .10 |
| $A_f$ | .618 | .30 | .11 |
| $C_s$ | .831 | .54 | .19 |
| C | .962 | .73 | .26 |

TABLE II-continued

| Cell Size | Casing Inside Diameter | Area of Casing Bottom (in.$^2$) | Material Required (gm.) |
|---|---|---|---|
| D | 1.226 | 1.18 | .42 |

As the foregoing table indicates, only a very small quantity of liquid insulation material is required to accomplish electrical isolation of the casing and electrodes. Moreover, no material is wasted, as is the case when insulating disks are blanked out from raw plastic sheet stock and the material is less expensive to apply.

Although the invention has been described with reference to preferred embodiments, modifications and variations will occur to those skilled in the art without departing from the spirit and scope of the invention. For example, the material need not harden or cure to a rigid layer in order to be effective, but can be effective even though elastic or somewhat resilient. Thus, it should be understood that the embodiments described are not to the exclusion of other acceptable embodiments defined by the appended claims.

What is claimed is:

1. In an electrochemical cell having a conductive casing and an electrode plate assembly received therein, said plate assembly having exposable portions adjacent an interior conductive surface of the casing, the improvement comprising a hardened, initially flowable, insulating casting material self-adhered to said interior conductive surface and disposed intermediate said interior conductive surface and the exposable portions of said electrode plate assembly, said casting material being present in such amount as to prevent inadvertent electrical contact between portions of the plate assembly and the interior surface, and as to leave exposed an area of said interior conductive surface, and conductor means for electrically connecting another portion of said electrode assembly to said exposed surface area.

2. The electrochemical cell of claim 1, wherein said casting conforms to the geometry of said interior surface at all points of contact therewith.

3. The electrochemical cell of claim 1, wherein said casing is in the form of a cylinder having a closed end and said electrode plate assembly comprises interleaved spirally-wound plate electrodes having exposed edges, said insulating casting being disposed intermediate said closed casing end and the exposed edges of said electrodes, said conductor being electrically connected to one of said plate electrodes.

* * * * *